United States Patent
He et al.

(10) Patent No.: US 8,756,012 B2
(45) Date of Patent: Jun. 17, 2014

(54) SYSTEM AND METHOD FOR DISPLAYING PERFORMANCE BASED RANGE AND TIME SCALES ON A NAVIGATION DISPLAY

(75) Inventors: Gang He, Morristown, NJ (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/366,041

(22) Filed: Feb. 3, 2012

(65) Prior Publication Data

US 2013/0204523 A1 Aug. 8, 2013

(51) Int. Cl.
G01C 21/34 (2006.01)

(52) U.S. Cl.
USPC ........... 701/527; 701/532; 701/533; 701/439; 701/120; 701/96; 701/436; 701/454; 342/357.55; 342/357.74; 342/357.75; 342/179; 342/180

(58) Field of Classification Search
USPC ......................................................... 701/532
See application file for complete search history.

(56) References Cited

U.S. PATENT DOCUMENTS

| | | | |
|---|---|---|---|
| 5,121,325 A | 6/1992 | DeJonge | |
| 6,112,141 A | 8/2000 | Briffe et al. | |
| 6,163,743 A | 12/2000 | Bomans et al. | |
| 6,584,382 B2 * | 6/2003 | Karem | 701/3 |
| 6,604,044 B1 * | 8/2003 | Kirk | 701/120 |
| 6,633,810 B1 | 10/2003 | Qureshi et al. | |
| 6,922,631 B1 | 7/2005 | Dwyer et al. | |
| 7,072,746 B1 | 7/2006 | Burch | |
| 7,561,069 B2 | 7/2009 | Horstemeyer | |
| 7,657,370 B2 | 2/2010 | Nagase et al. | |
| 7,711,478 B2 | 5/2010 | Gluck | |
| 7,765,061 B1 * | 7/2010 | Barber et al. | 701/467 |
| 7,880,642 B2 | 2/2011 | Gueziec | |
| 8,046,159 B2 | 10/2011 | Goodman et al. | |
| 2003/0001770 A1 * | 1/2003 | Cornell et al. | 342/26 |
| 2006/0227047 A1 * | 10/2006 | Rosenberg | 342/357.13 |
| 2007/0150124 A1 | 6/2007 | Wipplinger et al. | |
| 2008/0021627 A1 * | 1/2008 | Johnsson | 701/96 |
| 2009/0271105 A1 * | 10/2009 | Kindo et al. | 701/201 |
| 2010/0280750 A1 | 11/2010 | Chen et al. | |

(Continued)

FOREIGN PATENT DOCUMENTS

| | | |
|---|---|---|
| EP | 2166311 A2 | 3/2010 |
| EP | 2189755 A1 | 5/2010 |
| WO | 0187708 A2 | 11/2001 |

OTHER PUBLICATIONS

EP Search Report for application No. 13 152 232.8 dated Jun. 5, 2013.

*Primary Examiner* — Redhwan K Mawari
(74) *Attorney, Agent, or Firm* — Ingrassia Fisher & Lorenz, P.C.

(57) ABSTRACT

A display system and method is provided for deployment on board a vehicle and includes a data source that provides the display system with data indicative of at least time, position, and velocity of the vehicle. The system comprises a monitor, a display included within the monitor for displaying range data indicative of a specific distance and time data indicative of time it takes to travel the specific distance, an input device, and a processor coupled to the monitor and to the input device and configured to (1) render symbology on the display visually representative of the time data and the range data, and (2) update the range data, and correspondingly change the time data in response to the change in range data made via the input device.

15 Claims, 6 Drawing Sheets

(56) References Cited

U.S. PATENT DOCUMENTS

| | | |
|---|---|---|
| 2011/0137554 A1 | 6/2011 | Geelen et al. |
| 2011/0144904 A1 | 6/2011 | Pinkus et al. |
| 2011/0153204 A1 | 6/2011 | Coulmeau et al. |
| 2011/0172914 A1 | 7/2011 | Coulmeau et al. |
| 2011/0196604 A1* | 8/2011 | Kindo et al. .................. 701/200 |
| 2011/0213552 A1* | 9/2011 | Kindo et al. .................. 701/209 |

* cited by examiner

SYSTEM AND METHOD FOR DISPLAYING PERFORMANCE BASED RANGE AND TIME SCALES ON A NAVIGATION DISPLAY

TECHNICAL FIELD

Embodiments of the subject matter described herein relate generally to vehicular display systems and, more particularly, to an avionics display system for visually expressing flight information on a host aircraft that includes performance based time and range scales.

BACKGROUND

Avionics display systems deployed aboard aircraft have been extensively engineered to visually convey a considerable amount of flight information in an intuitive and readily comprehendible manner. In conventional avionics display systems, the majority of the information visually expressed on a display, such as a primary flight display, pertains to the host aircraft's flight parameters (e.g., the heading, drift, roll, and pitch of the host aircraft), nearby geographical features (e.g., mountain peaks, runways, etc.), and current weather conditions (e.g., developing storm cells). Aside from a neighboring aircraft's current detected position, conventional avionics display systems typically provide little, if any, visual information pertaining to neighboring aircraft. This may be due, in part, to current air traffic management ("ATM") practices wherein air traffic management is generally managed by personnel stationed within air traffic control and other ground-based control facilities. However, conventional control facility-based ATM systems are inherently limited in the volume of air traffic that they can effectively manage during a given time period. For this reason, the United States has commenced the development and implementation of a modernized ATM system (commonly referred to as the "Next Generation Air Transportation System" or, more simply, "NextGen") in which air traffic management will be largely handled by individual flight crews utilizing data compiled from a constellation of computerized systems onboard, satellites, and neighboring aircraft.

A multi-function display (MFD) is a device typically mounted on the instrument panel of an aircraft for displaying information and data associated with radar, weapons stores, navigation, etc. The MFD is divided into sections, which can be selected and viewed by a crew member. A navigational map display is one of the most important pages available on the MFD and visually represents what one would see looking directly down on the aircraft or other point of interest; e.g. waypoints, destination city, etc. For the sake of convenience, the following discussion will focus on the scenario which places the host aircraft at the center of at least one range ring displayed of the lateral map or navigational map and representing a specified distance from the host aircraft. For example, three concentric range rings around a host aircraft may each represent one third of the currently selected display range; i.e. if the display range is fifteen nautical miles (NM), each ring may represent an increment of five NM.

However, NextGen operations will require more precise trajectory management in both the space and time domains (i.e. 4D navigation). Thus, flight crews must not only understand and visualize both current and intended trajectories, but must also understand the time scales associated with partial or entire trajectories. This is essential in NextGen operations involving both spatial and time constraints for maximum system efficiency and throughput.

Typical navigation displays provide only spatial scale display with limited time information augmentation; e.g. time windows and time maps. As such, these solutions offer only limited situational awareness in the time domain. Thus, it should be clear that to meet 4-D navigation requirements and increase a pilot's situational awareness within the time domain, it would be desirable to provide performance based range and time scales synchronized in the sense that as one is adjusted, the other is automatically and similarly updated.

BRIEF SUMMARY

A display system is provided for deployment on board a vehicle and includes a data source that provides the display system with data indicative of at least time, position, and velocity of the vehicle. The system comprises a monitor, a display included within the monitor for displaying range data indicative of a specific distance and time data indicative of time it takes to travel the specific distance, an input device, and a processor coupled to the monitor and to the input device and configured to (1) render symbology on the display visually representative of the time data and the range data, and (2) update the range data, and correspondingly change the time data in response to the change in range data made via the input device.

A method is also provided for displaying a range window and a time window on a display in a vehicular display system and visually rendering on the display a textual representation of the distance between a first location to a second location and the travel-time from the first location to the second location. The method comprises generating range symbology visually representative of the distance, displaying the range symbology on the display, generating symbology visually representative of the travel time, displaying the travel-time symbology on the display, changing the displayed travel time via an input device, generating updated range symbology corresponding to the change in travel-time, and displaying the updated range symbology.

Additionally, there is provided a process to be carried out by an avionics display system including a cockpit display, a monitor, a processor, and input device coupled to the processor, deployed on a host aircraft, for visually rendering on the cockpit display the distance between a first location and a second location and the flight-time from the first location to the second location. The process comprises generating range symbology in the processor visually representative of the distance between the first location and the second location, displaying the range symbology on the vehicle display, generating time symbology in the processor visually representative of the time to fly from the first location to the second location, displaying the time symbology on the cockpit display, changing the time symbology via the input device, and updating the range symbology in response to changing the time symbology.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
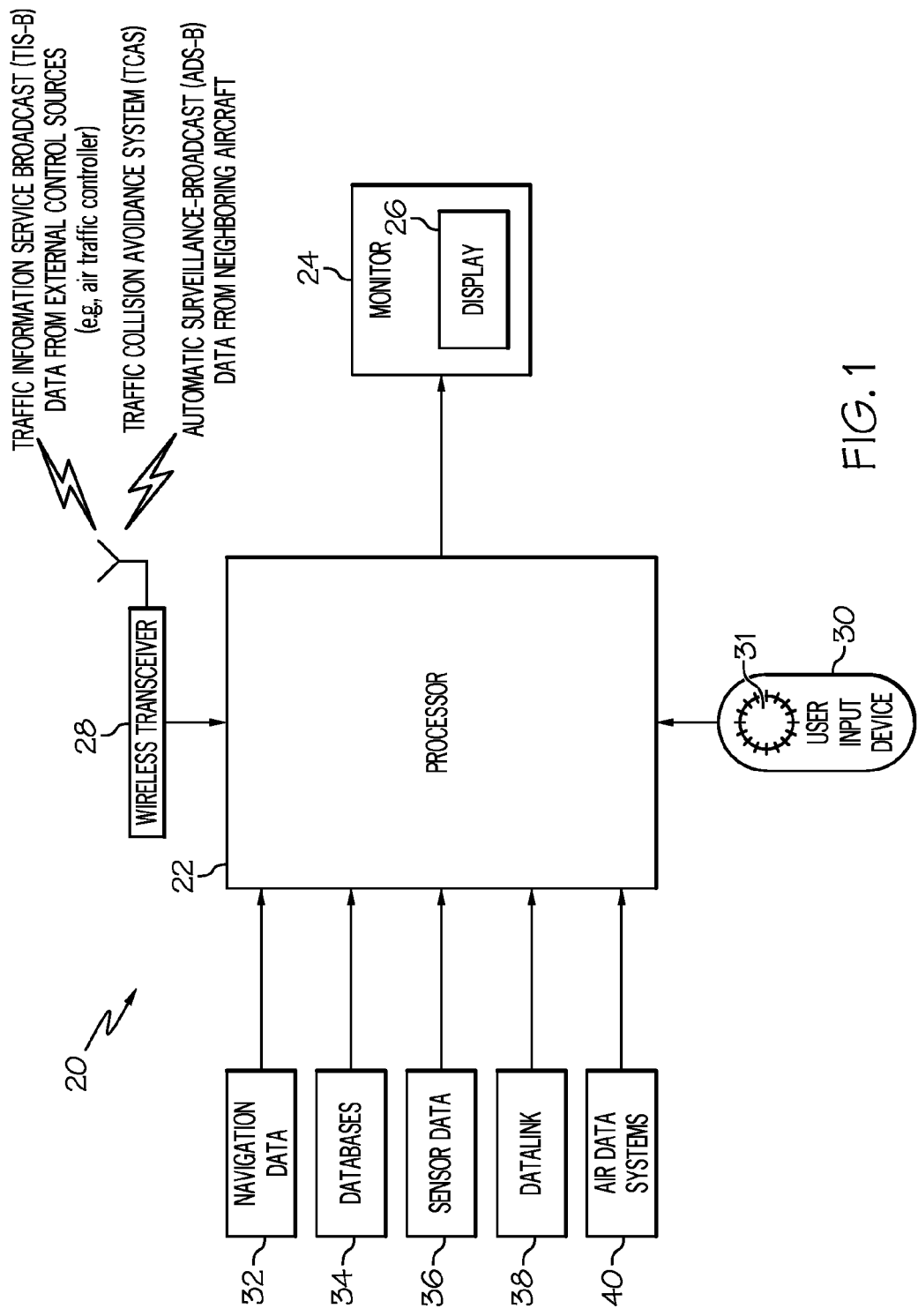
FIG. 1 is functional block diagram of a generalized avionics display system in accordance with an exemplary embodiment.

FIG. 1 is a functional block diagram of a generalized avionics display system 20 in accordance with an exemplary embodiment. Avionics display system 20 includes at least one processor 22 and at least one monitor 24, which is operatively coupled to processor 22. An input device 30 (e.g. cursor control device, keyboard, touchscreen, rotary knob, etc.) may be coupled to processor 22 to enable the entry of data by a crew member into the memory of processor 22. During operation of avionics display system 20, processor 22 drives monitor 24 to produce a graphical display 26 that visually provides a pilot and crew with navigational informational pertaining to the host aircraft and to neighboring aircraft within a predetermined vicinity of the host aircraft. Graphical display 26 may include visual representations of one or more of flight characteristics pertaining to a neighboring aircraft, as described more fully below. Processor 22 may generate display 26 in a two dimensional format (e.g., as a moving map display), in a three dimensional format (e.g., as a perspective display), or in a hybrid format (e.g., in a picture-in-picture or split screen arrangement).

Processor 22 may comprise, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below. In a preferred embodiment, processor 22 is included within a Flight Management Computer of the type commonly deployed within a Flight Management System (FMS).

The processor architecture 22 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor architecture 22 such that the processor architecture 22 can read information from, and write information to, the memory. In the alternative, the memory may be integral to the processor architecture 22. In practice, a functional or logical module/component of the system described here might be realized using program code that is maintained in the memory. Moreover, the memory can be used to store data utilized to support the operation of the system.

In an exemplary embodiment, the display 26 cooperates with a suitably configured graphics system (not shown). This allows the display 26 to display, render, or otherwise convey one or more graphical representations, synthetic displays, graphical icons, visual symbology, or images associated with operation of the host aircraft on the display element, as described in greater detail below. In practice, the display element receives image rendering display commands from processor 22.

The user input device 30 may be realized as a user input device that receives input from a user (e.g., a pilot) and, in response to the user input, supplies appropriate signals to processor 22. The user interface may be any one, or any combination, of various known user input devices or technologies, including, but not limited to: a cursor control device such as a mouse, trackball, joystick, keyboard, buttons, switches, or knobs. Moreover, the user interface may cooperate with the display 26 to provide a touch screen interface. The user input device 30 may be utilized to vary range and/or time of closure as will be described in more detail below.

Image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an aircraft's Electronic Flight Instrument System (EFIS). Monitor 24 may be disposed at various locations throughout the cockpit. For example, monitor 24 may comprise a primary flight display (PFD) and reside at a central location within the pilot's primary field-of-view. Alternatively, monitor 24 may comprise a secondary flight deck display, such as an Engine Instrument and Crew Advisory System (EICAS) display, mounted at a location for convenient observation by the aircraft crew but that generally resides outside of the pilot's primary field-of-view.

Processor 22 includes one or more inputs operatively coupled to one or more data sources. During operation of display system 20, TCAS and/or radar continually provide processor 22 with data pertaining to neighboring aircraft. In the exemplary embodiment illustrated in FIG. 1, the data sources include a wireless transceiver 28 and a source of navigation data 32, which are operatively coupled to first and second inputs of processor 22, respectively. Navigation data source 32 may include an onboard radar and various other onboard instrumentation, such as a radio altimeter, a barometric altimeter, a global positioning system (GPS) unit, and the like. In a preferred embodiment, the FMS system receives and combines this data to produce the trajectory that the aircraft follows. An onboard radar altimeter may be included within a Terrain Awareness and Warning System (TAWS), such as an Enhanced Ground Proximity Warning System (EGPWS).

With continued reference to FIG. 1, wireless transceiver 28 receives navigational data from external control sources and relays this data to processor 22. For example, wireless transceiver 28 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 28 may receive Automatic Dependent Surveillance-Broadcast (ADS-B) data and Traffic Collision Avoidance System (TCAS) from neighboring aircraft. TIS-B data, ADS-B data, and TCAS data other such external source data is preferably formatted to include air traffic state vector information, which may be utilized to determine a neighboring aircraft's current position. Furthermore, in accordance with embodiments of the present invention, the TIS-B data, the ADS-B, and/or the TCAS data may also be formatted to include additional information useful in determining other flight characteristics of the neighboring aircraft including the neighboring aircraft's current flight plan.

Databases 34 represent sources of data and information that relate to flight plan, restricted airspace, waypoints, destination and departing airports, etc. Weather data such as wind profile and thunderstorm information can be provided to the aircraft via datalink 38. Air data system 40 supplies current flying parameters such as airspeed that the FMS and other on-board system used to compute and project current and future trajectories and performance parameters. The combined system provides data such as current estimated gross weight of the aircraft, aircraft GPS position, aircraft groundspeed, and environmental conditions such as outside air temperature, weather, RVR visibility wind speed and direction, and local or zulu time of day, etc. Some of this data may be entered into processor 22 manually by a crew-member.

Sensor data sources 36 represents various sensor elements, detectors, diagnostic components, and their associated subsystems onboard the aircraft. In this regard the sensor data sources 36 function as sources of aircraft status data for the host aircraft, including, without limitation, data indicative of outside temperature, aircraft ground speed, geographic position of the aircraft, electric taxi, or the like.

Data sources 28, 32, 34, 36, 38, and 40 described in connection with FIG. 1 provide static and/or real-time information to processor 22, which processor 22 may utilize to generate one or more displays on display 26, such as the horizontal situation display of a multi-function display. The data sources may include a wide variety of informational systems, which may reside onboard the aircraft or at a remote location. By way of example, the data sources may include one or more of the following systems: an instrument landing system, an airport data base, a flight director system, a weather data system, a terrain avoidance and warning system, a traffic and collision avoidance system, a terrain database, an inertial reference system, and a navigational database. The data sources may also include mode, position, and/or detection elements (e.g., gyroscopes, global positioning systems, inertial reference systems, etc.) capable of determining the mode and/or position of the aircraft relative to one or more reference locations, points, planes, or navigation aids. Data may be retrieved from other sources (e.g. FMS, GPS, etc.) or manually entered if no guidance system is available. The data described above may be utilized by processor 22 to achieve more precise 4D flight management, utilizing an understanding of time scales associated with flight trajectories.

Figure 2:
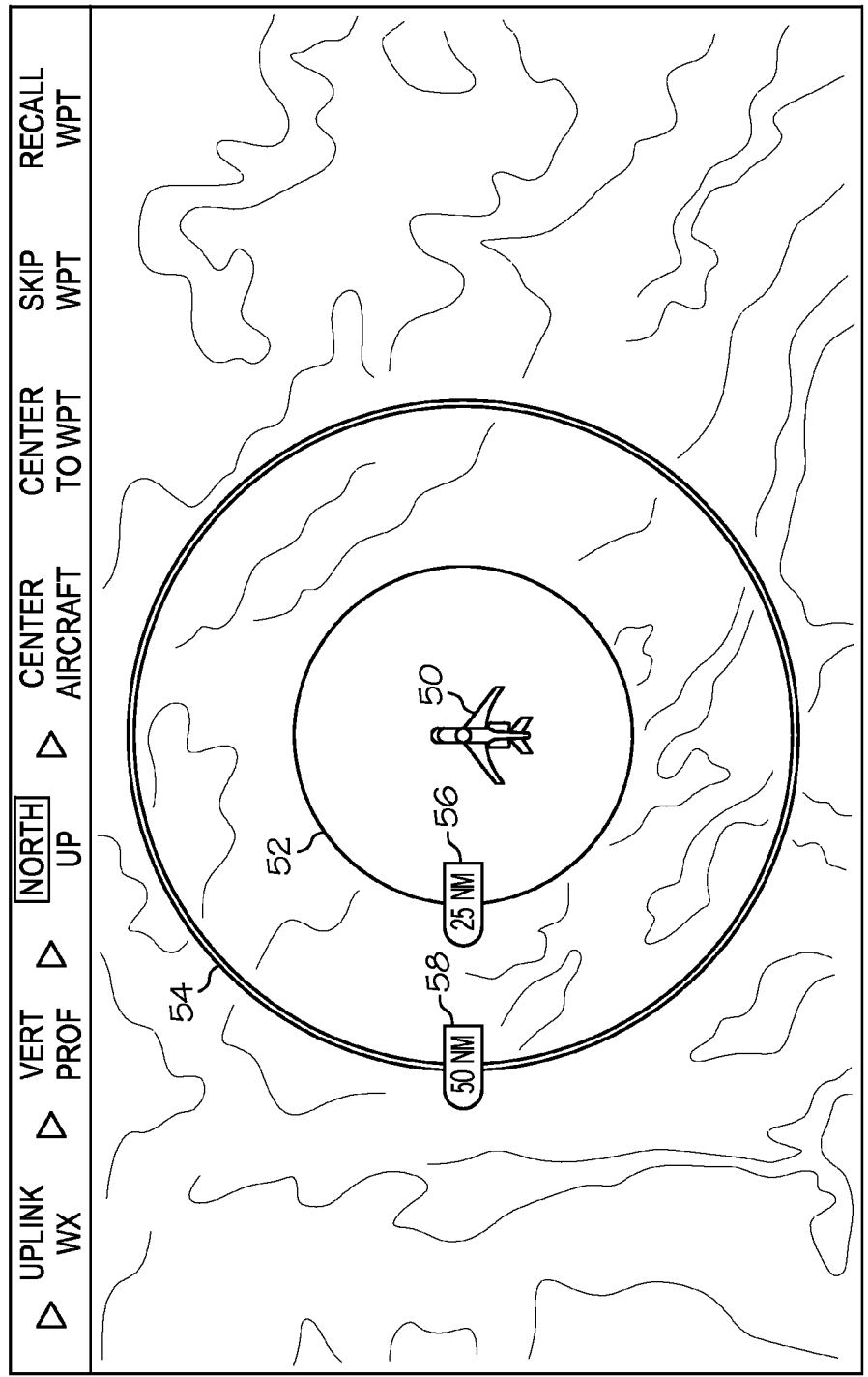
FIG. 2 is a typical horizontal situation display illustrating an aircraft surrounded by first and second range rings.

FIG. 2 illustrates a typical navigational map display including host aircraft 50 and, for example, first and second range rings 52 and 54 graphically displayed concentrically around aircraft 50. As can be seen, symbology in the form of a first window 56 is graphically positioned on range ring 52. This window textually indicates and visually representing that aircraft 50 is, for example, 25 NM from any point on range ring 52. Similarly, symbology in the form of a second window 58 is graphically displayed on range ring 54. Window 58 textually indicates and visually represents that aircraft 50 is, for example, 50 NM from any point on range ring 54. In practice, a greater or lesser number of range rings may be displayed. Unfortunately, while the HSD display shown in FIG. 2 yields information in the spatial domain (i.e. distance), it gives a crew-member little or no information in the time domain.

Figure 3:
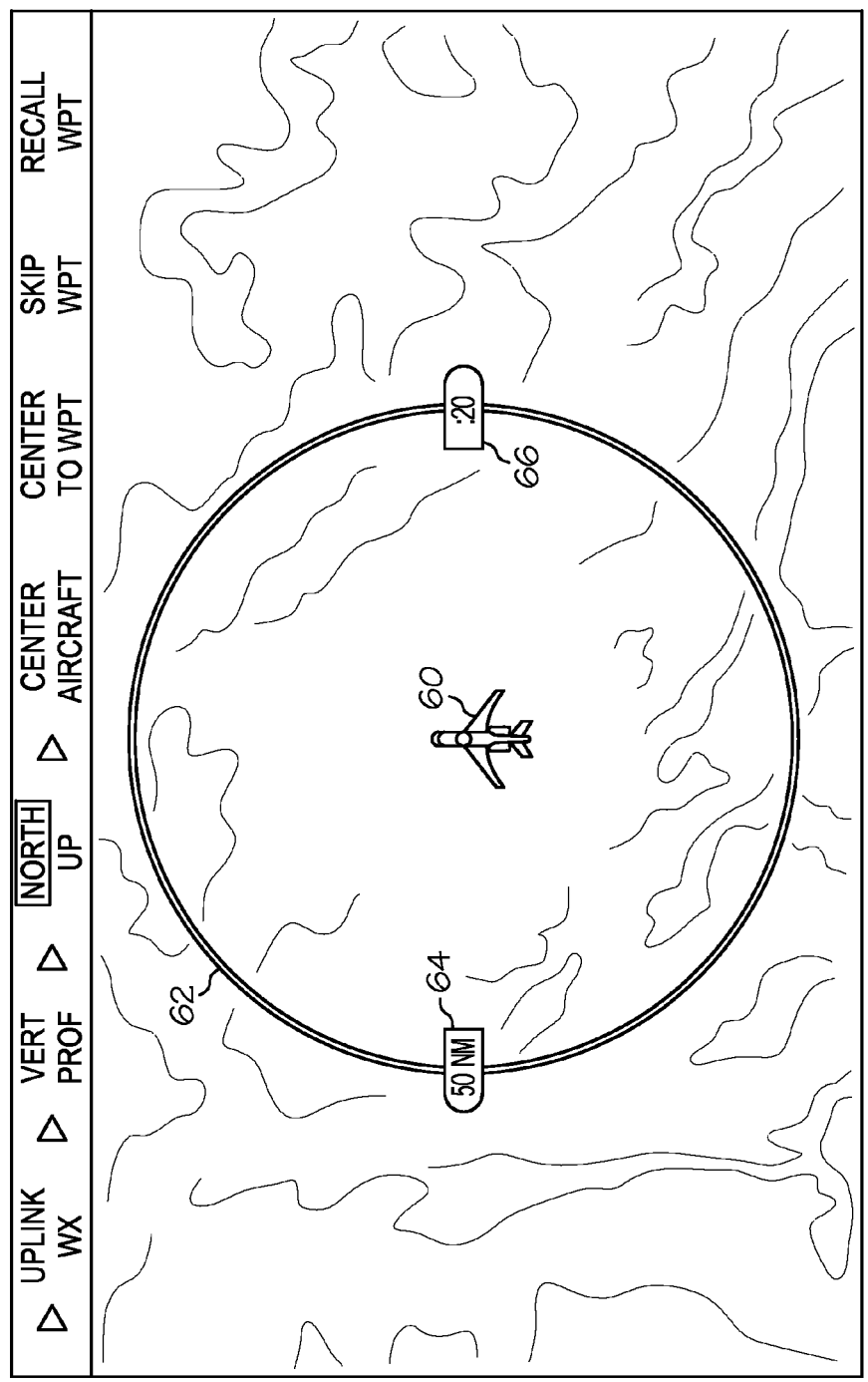
FIG. 3 is shown an HSD display in accordance with a first embodiment and having a host aircraft centered thereon.

Referring now to FIG. 3, there is shown a map display in accordance with a first embodiment. As can be seen, range ring 62 is graphically displayed around host aircraft 60. Only a single range ring is shown for clarity; however, the following discussion is equally applicable to an HSD display including multiple range rings. As was the ease in FIG. 2, symbology in the form of a first window 64 is graphically positioned on range ring 62 to textually indicate a range of, for example, 50 NM from aircraft 60. However, unlike FIG. 2, symbology in the form of a second window 66 is generated on range ring 62, and symbology is generated and displayed within window 66 visually representing the predicted elapsed flight-time necessary to reach the distance displayed on range ring 62 under current flight conditions; e.g. current ground speed, wind profile, predicted ground speed for the region displayed, etc. This predicted time is determined by processor 22 (FIG. 1) based on the range (in window 64) and factoring in the relevant data supplied to processor 22 and described in connection with FIG. 1. When the navigational map is centered on aircraft 60 as is the case in FIG. 3, the predicted time may be based on current ground speed whereas when the map is entered on, for example, a waypoint well ahead of the current aircraft position and perhaps under a required-time-of-arrival (RTA) constraint, the predicted time may be determined using predicted ground speed at that location, where the prediction is typically based on full trajectory optimization to achieve the required time of arrival at the point. If the map is centered on a location not currently on the stored flight plan, the time scale may be determined using predicted ground-speed based on current heading directly to that location.

The embodiments described herein contemplate the automatic updating of the time scale when the range scale is altered, and/or the automatic updating of the range scale when the time scale is altered. For example, user input device 30 may be used to select either the range window or the time window and alter the contents thereof via, for example, a rotating knob 31. This results in the automatic updating of the contents of the non-selected window. That is, when processor 22 recognizes that the time or range window has been selected and the contents thereof have been changed, processor 22 will determine the value of the non-selected window and generate the required symbology for display in the non-selected window utilizing the data described in connection with FIG. 1.

Figure 4:
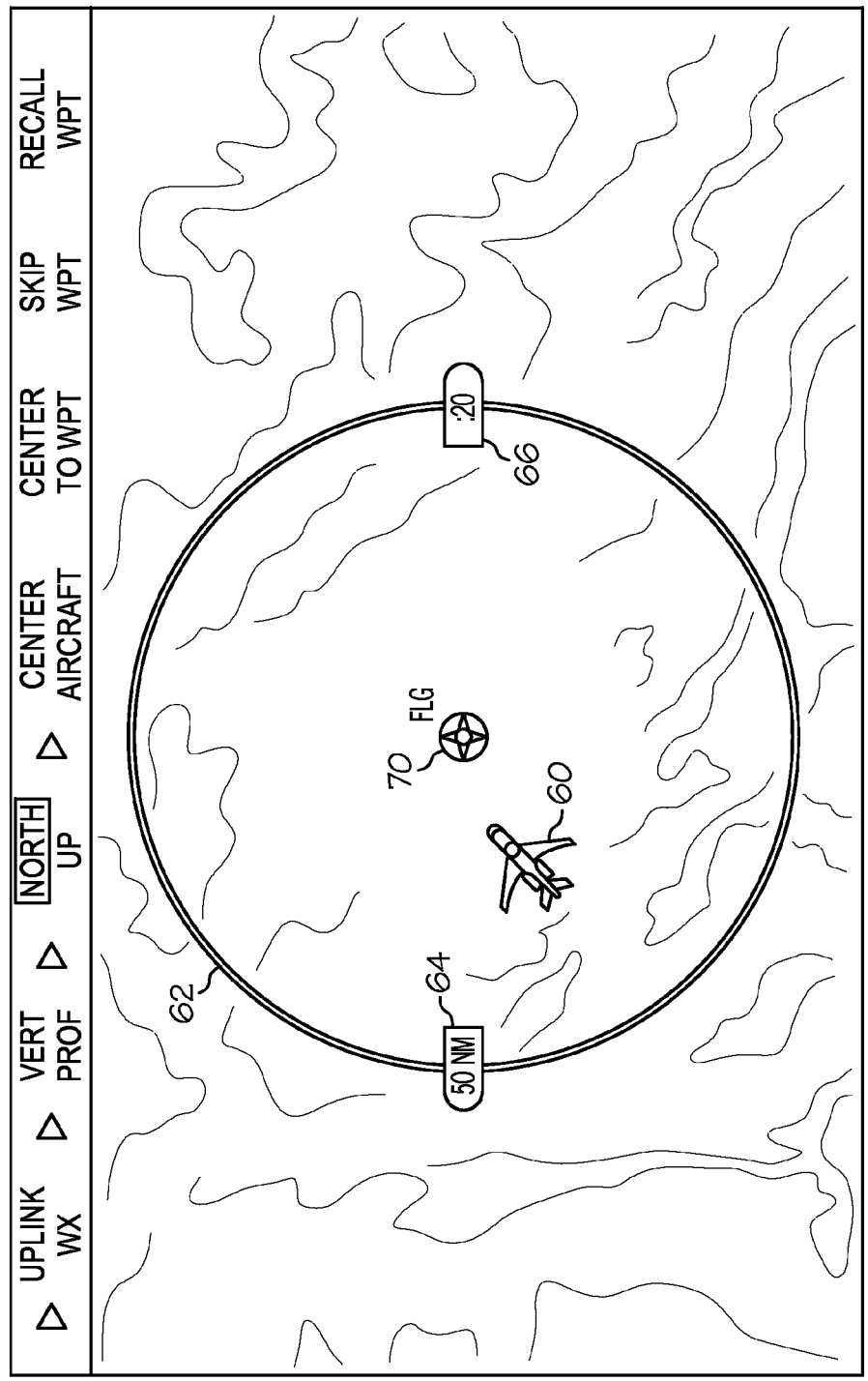
FIG. 4 illustrates an HSD in accordance with a second embodiment and having a waypoint centered thereon.

FIG. 4 illustrates a scenario wherein the map is centered on other than the host aircraft; for example, a waypoint 20. This may be useful for determining range and time parameters resulting from flight characteristics (e.g. wind, weather, etc.) in the vicinity of waypoint 70. It may also be useful to utilize the time and range scales to meet NextGen Required-Time-of-Arrival (RTA) requirements. That is, by manipulating and monitoring the time and range scales, aircraft performance characteristics may be adjusted to meet the RTA.

Figure 5:
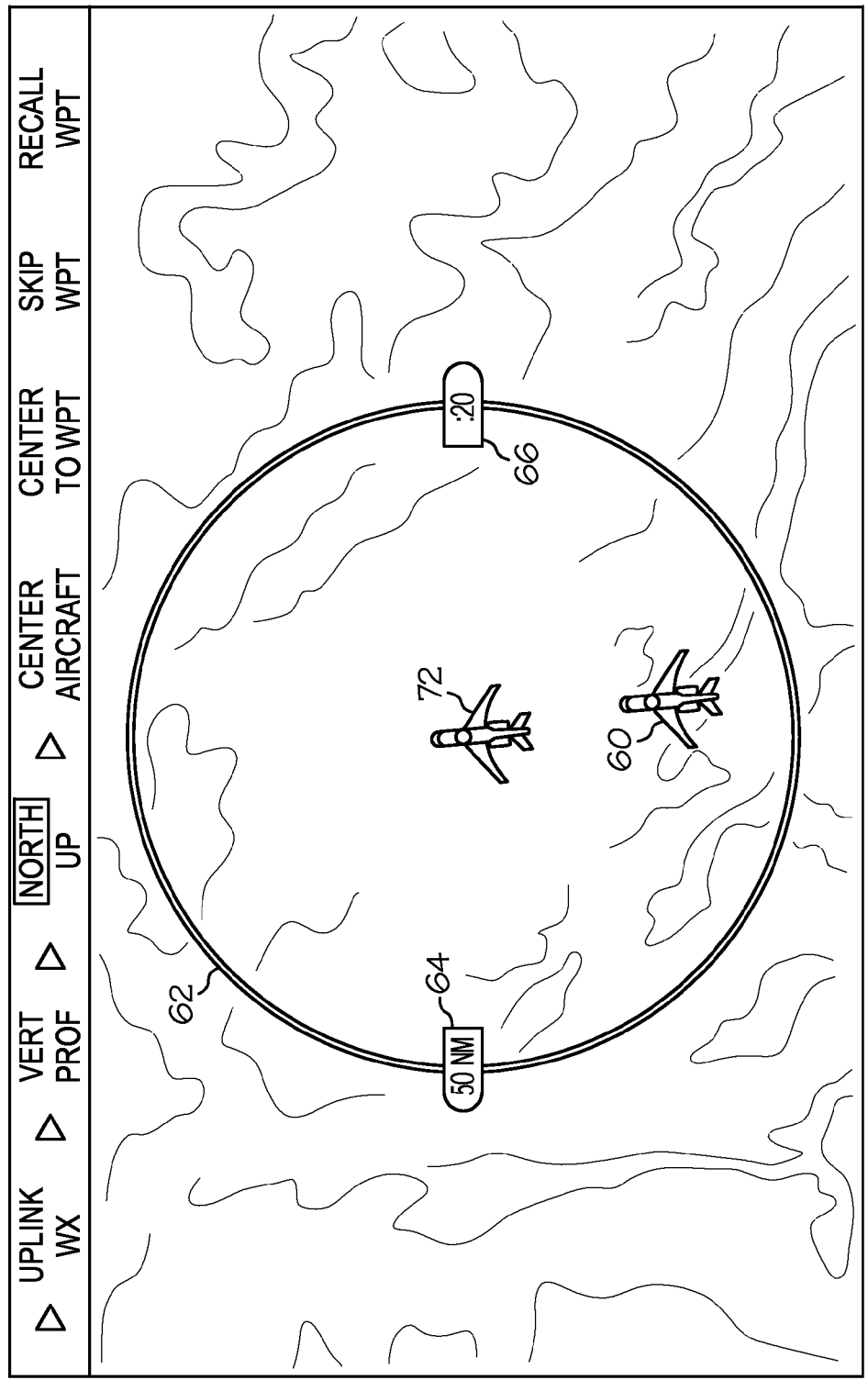
FIG. 5 illustrates an HSD in accordance with a third embodiment and having an aircraft centered thereon followed by a host aircraft.

In some cases, it may be advantageous to center the map on another aircraft 72 as is shown in FIG. 5. This would be especially true if the host aircraft 60 were instructed to follow another aircraft 72 by a specific distance in which case symbology would be generated by processor 22 to reflect the specific distance in range window 64 via input device 30 (FIG. 1). Similarly, if host aircraft 60 were instructed to follow aircraft 72 by a specific time, symbology would be generated by processor 22 to reflect the specific time in time window 66. In both cases, aircraft performance characteristics may be adjusted to meet RTA requirements.

Figure 6:
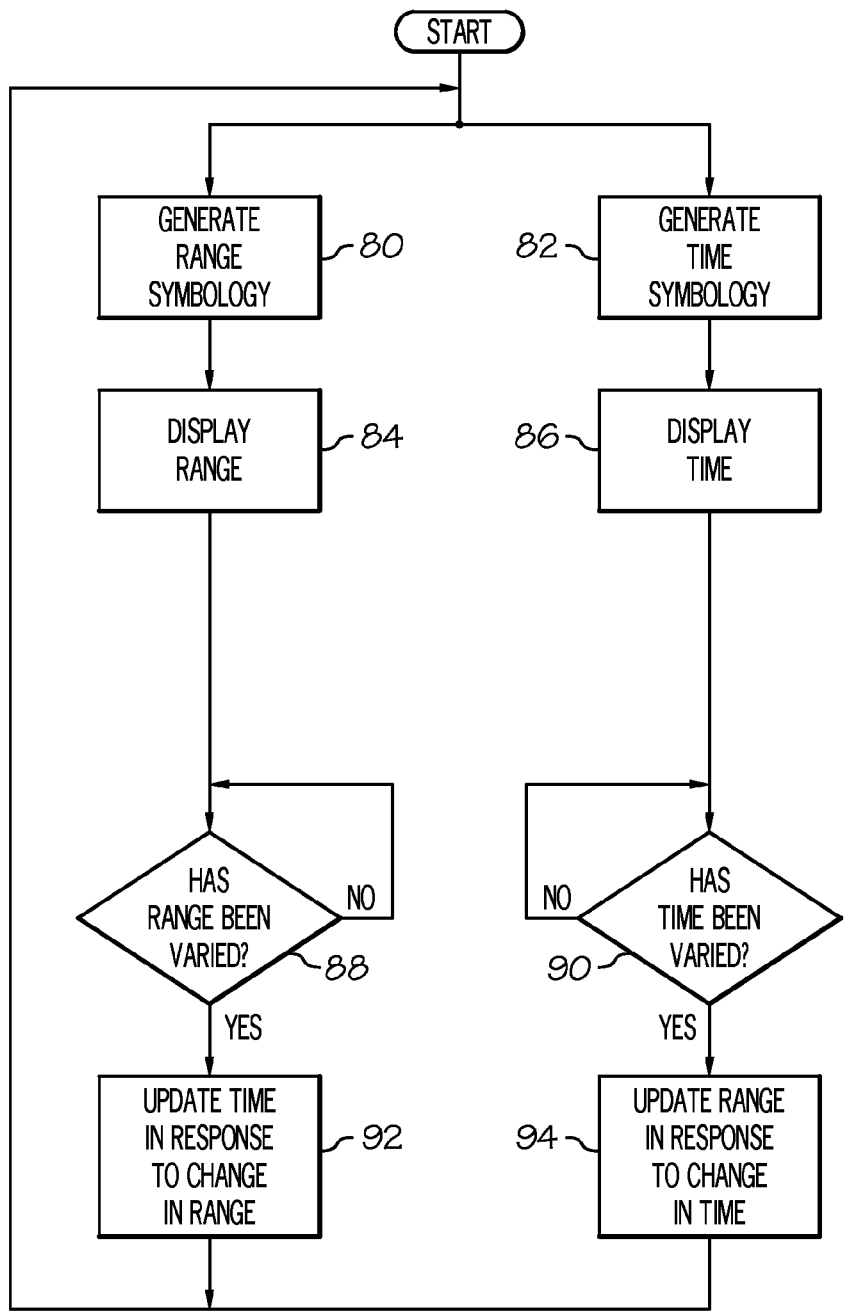
FIG. 6 is a flowchart illustrating an exemplary embodiment of a method for displaying performance based range and time scales on a navigation display.

FIG. 6 is a flowchart illustrating an exemplary embodiment of a method of displaying performance based range and time scales on a navigation display. The method begins when range symbology and time symbology are generated by processor 22 (STEP 80 and STEP 82, respectively) and subsequently provided to monitor 24 for display on display 26 (STEP 84 and STEP 86, respectively). The proceeds by detecting a change made to the range or to the time via the input device 30 (STEP 88 and STEP 90, respectively). If a change in range made via input device 30 is detected, the computer updates the time displayed accordingly (STEP 92). Thus, if an increase or decrease in range is detected, processor 22 will determine the corresponding increase or decrease, respectively, in time, symbology reflective of the change in time to be generated, and provide that symbology to monitor 24 for display on display 26 (STEP 92). That is, knowing the operational parameters of the vehicle (e.g. ground speed, etc.) it is a simple matter for processor to determine the time it will take to reach the new range. Similarly, if an increase or decrease in elapsed time made via input device 30 is detected, processor 22 will determine the corresponding increase or decrease, respectively, in range, cause symbology reflective of the change in range to be generated, and provide that symbology to monitor 24 for display.

Thus, there has been provided a system and method for providing synchronized, performance based range and time scales that meet NextGen 4D navigation requirements and significantly increase a pilot's situational awareness in the time domain.

While the foregoing exemplary embodiment was described above in the context of a fully functioning computer system (i.e., avionics display system 20 shown in FIG. 1), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution. Furthermore, although described above in the context of an aircraft, embodiments of the method and system are equally applicable to vehicles in general. Furthermore, although described above in the context of an in-flight aircraft, embodiments of the method and system are equally applicable to all phases of flight including takeoff, climb-out, final approach, and landing.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for displaying range and time on a display in an aircraft display system and visually rendering on the display a textual representation of the distance between a first location to a second location and a predicted travel-time from the first location to the second location, the method comprising:
    generating range symbology in the form of a range ring visually representative of the distance;
    displaying the range symbology on the display;
    generating symbology visually and textually representative of the predicted travel-time;
    displaying the travel-time symbology on the display;
    changing the displayed travel time via an input device;
    generating updated range symbology corresponding to the change in travel-time;
    displaying the updated range symbology;
    changing the displayed range via the input device;
    generating updated time symbology corresponding to the change in range; and
    displaying the updated time symbology.

2. A method according to claim 1 wherein the first location is a predetermined location.

3. A method according to claim 2 wherein the first position corresponds to the location of the aircraft.

4. A method according to claim 3 further comprising:
    generating symbology visually representative of a range window;
    displaying the range window on the display; and
    displaying the range symbology inside the range window.

5. A method according to claim 4 further comprising:
    generating symbology visually representative of a time window;
    displaying the time window on the display; and
    displaying the time symbology inside the time window.

6. A method according to claim 5 wherein the range window is positioned on the range ring.

7. A method according to claim 5 wherein the time window is positioned on the range ring.

8. A method according to claim 5 wherein the time window and the range window are positioned on the range ring.

9. A method according to claim 2 wherein the first location is remote from the aircraft.

10. A method according to claim 9 the second location is a position on the aircraft's intended travel path.

11. A display system for deployment on board an aircraft including a data source that provides the display system with data indicative of at least time, position, and velocity of the vehicle, comprising:
    a monitor included within the display system;
    a display coupled to the monitor for displaying range data indicative of a specific distance and time data indicative of time it takes to travel the specific distance;

an input device for changing the range and the distance; and a processor coupled to the monitor and to the input device and configured to (1) render symbology on the display visually representative of the time data and the range data, and (2) update the range data; (3) update the distance data; (4) correspondingly change the time data in response to the change in range data made via the input device; and (5) correspondingly change the range data in response to the change in the distance data.

12. A display system according to claim 11 wherein the processor is further configured to generate symbology visually representative of a range window containing range data and a time window containing time data.

13. A display system according to claim 11 wherein the input device comprises:

a cursor control device for selecting one of the range window and the time window; and a rotary knob for varying data in the selected window.

14. A process to be carried out by an avionics display system including a cockpit display, a monitor, a processor, and input device coupled to the processor, deployed on a host aircraft, for visually rendering on the cockpit display the distance between a first location and a second location and the predicted flight-time from the first location to the second location, the process comprising:

generating range symbology in the processor visually representative of the distance between the first location and the second location;

displaying the range symbology on the vehicle display;

generating time symbology in the processor visually representative of the time to fly from the first location to the second location;

displaying the time symbology on the cockpit display;

changing the time symbology via the input device;

updating the range symbology responsive to changing the time symbology;

changing the range symbology via the input device; and updating the time symbology in response to the change in range symbology.

15. A process according to claim 14 further comprising generating symbology in the processor visually representative of a range window graphic for enclosing the range symbology and a time window graphic for enclosing the time symbology.

* * * * *